Figure 1:
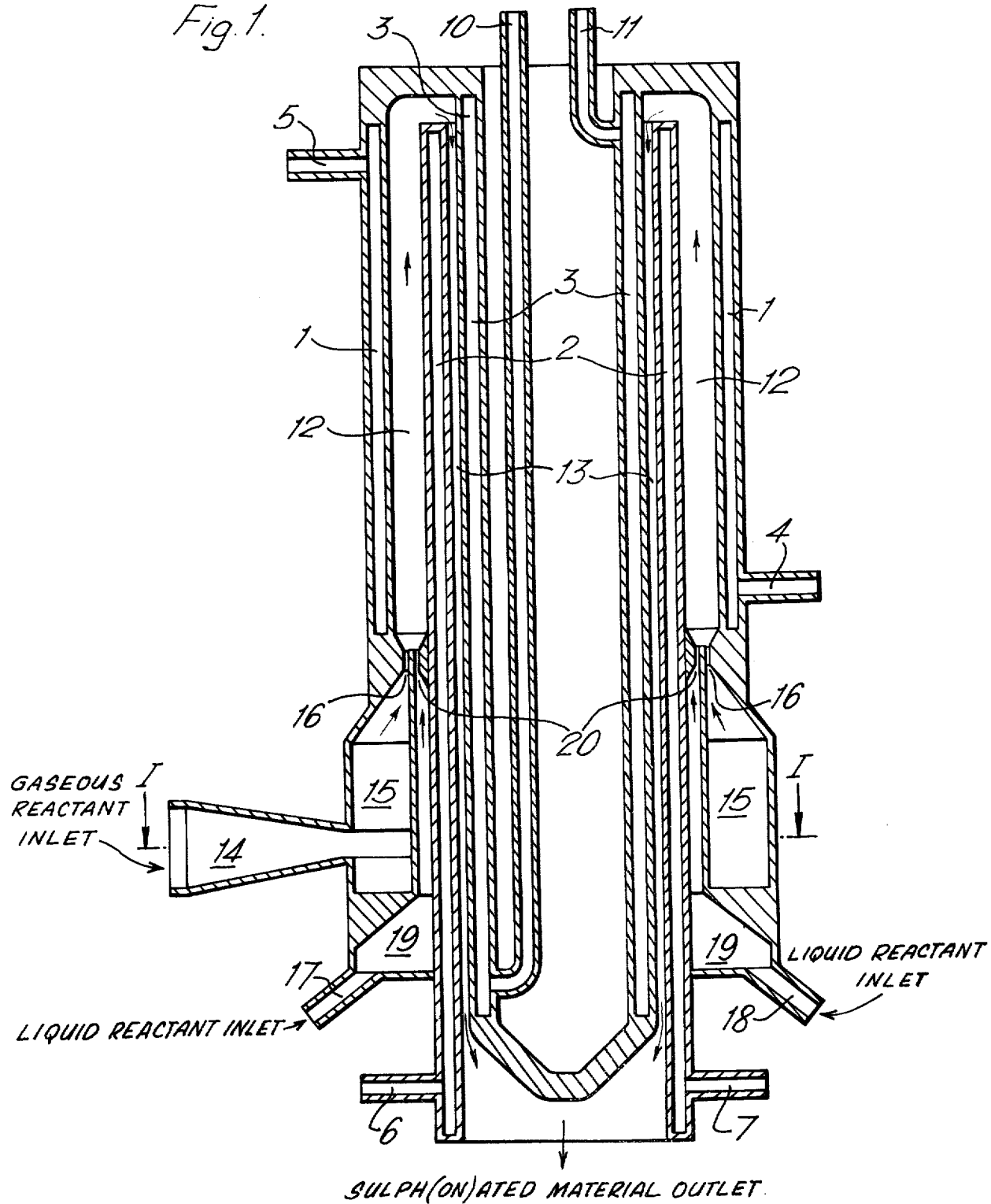

United States Patent [19]
Pryce

[11] 3,891,689
[45] June 24, 1975

[54] CONTINUOUS SULPHONATION PROCESS

[75] Inventor: Alan Pryce, Wirral, England

[73] Assignee: Lever Brothers Company, New York, N.Y.

[22] Filed: Jan. 19, 1972

[21] Appl. No.: 218,880

[30] Foreign Application Priority Data
Jan. 20, 1971 United Kingdom............... 2766/71

[52] U.S. Cl............. 260/458; 260/459; 260/505 S; 260/513 R; 260/400; 260/401; 260/457
[51] Int. Cl..........C07c 141/02; C07c 143/02; C07c 143/24
[58] Field of Search ..... 260/458, 459, 505 S, 513 R

[56] References Cited
UNITED STATES PATENTS
3,169,142   2/1965   Knoggs et al. .............. 260/459 R X Primary Examiner—Leon Zitver
Assistant Examiner—Norman P. Morgenstern
Attorney, Agent, or Firm—Lever Brothers Co.

[57] ABSTRACT

A sulphonation process involving a liquid organic material and sulphur trioxide is conducted in at least two separate steps, an initial step being conducted under conditions defined by a superficial gas velocity of from 1 to 300 ft per second, and the second or subsequent steps being conducted under conditions defined by higher superficial gas velocities of from about 5 to 400 ft per second. An apparatus adapted for use in the process is also disclosed.

2 Claims, 2 Drawing Figures

CONTINUOUS SULPHONATION PROCESS

The present invention relates to continuous processes for reacting fluid materials, and particularly to continuous processes for reacting liquid organic materials with sulphur trioxide, and also to apparatus in which such processes can be conducted.

The term "fluid" is used herein to encompass liquid materials and gaseous materials.

The reaction of liquid organic materials with sulphur trioxide is usually called "sulphonation," even though the products of such a reaction are either predominantly sulphates or sulphonates depending on whether or not the liquid organic materials contain hydroxyl groups, and hereinafter the term sulphonation is used to include all such reactions.

As the present invention is particularly applicable to sulphonation, it is hereinafter described in the context of sulphonation. However, once the invention has been so described, its utility in the general field of fluid reactions will become apparent.

Hitherto, continuous sulphonation conducted in shortresidence time reactors, ie those reactors in which the residence time is less than about 10 minutes, has generally been carried out in a single step involving the admixture of sulphur trioxide, usually diluted with an inert diluent gas, preferably air, with the organic material, and generally this step is followed by neutralisation and hydrolysis steps to recover the sulphonated material. In this context, the expression "residence time" is used to mean the period of time during which organic material in the reactor is converted to the maximum amount of sulphonated reaction product obtainable in the reactor. The reactants involved in the sulphonation step are generally vigorously mixed, either by mechanical agitation or by being passed at high velocity through a reaction chamber. This invention is concerned with processes wherein the mixing of the reactants involved in the sulphonation step is achieved by the latter method.

By the present invention it has been found that excellent sulphonation can be achieved with economic advantage if the sulphonation reaction is carried out under conditions such that the degree of mixing applied increases towards the end of the residence time, ie the degree of mixing applied is increased as the proportion of unreacted reactants decreases, the increased degree of mixing being achieved by conducting the sulphonation reaction in at least two distinct steps with the degree of the mixing applied to the reactants during the second and any subsequent steps being greater than that applied during the first step.

A convenient way of expressing the relative degree of mixing applied to the contents of gas-liquid reaction chambers is to compare the superficial gas velocities in the chambers. The superficial gas velocity in a chamber is the velocity at which the gaseous reactants pass through the chamber, in the absence of the liquid reactants. The superficial gas velocity in any given chamber can be calculated from the expression:

$$S = V/A$$

where $S$ is the superficial gas velocity in the chamber, expressed in feet per second; $V$ is the volume of gas at STP, expressed in cubic feet, which is fed into the chamber per second; and $A$ is the cross-sectional area of the chamber, expressed in square feet.

A sulphonation process according to the present invention comprises reacting a liquid organic material with sulphur trioxide in a sulphur trioxide-diluent gas mixture in at least two separate steps, an initial step being conducted in a reaction chamber in which chamber the superficial gas velocity is within the range of from about 1 to about 300 ft per second, and subsequent steps being conducted in one or more reaction chambers in which chambers the superficial gas velocities are higher than that in the initial reaction step chamber and are within the range of from about 5 to about 400 ft per second, the initial concentration of sulphur trioxide in the sulphur trioxide-diluent gas mixture being from about 1 to about 50% by volume, the initial mole ratio of sulphur trioxide to liquid organic material being from about 0.5:1 to about 2.0:1 and the pressure under which the reaction is conducted being from about 1 to about 100 pounds per square inch absolute (psia). The final sulphonation step can be followed by the neutralisation and hydrolysis of the reaction products of the sulphonation steps.

In a preferred process according to the invention reacting the liquid organic material and the sulphur trioxide is accomplished in two steps, and the superficial gas velocity in the reaction chamber in which the first step is conducted is from about 5 to about 30 ft per second and the superficial gas velocity in the reaction chamber in which the second step is conducted is from about 15 to about 90 ft per second, the initial concentration of sulphur trioxide in the sulphur trioxide-diluent gas mixture is from about 2 to about 15% by volume, the initial mole ratio of sulphur trioxide to organic material is from about 1.0:1 to about 1.4:1, and the pressure under which the reaction is conducted being from about 5 to about 30 psia.

An important aspect of the invention is an apparatus specifically adapted for use in a process according to the invention, which apparatus comprises three substantially vertical hollow walls defining between them two interconnected adjacent reaction chambers, one of which reaction chambers has a larger horizontal cross-sectional area ie, transverse cross-sectional area, than the other reaction chamber, a liquid organic material distributor inlet to the reaction chamber having the larger horizontal cross-sectional area and a sulphur trioxide-diluent gas mixture distributor inlet adjacent to the liquid organic material distributor inlet, an outlet for the sulphonation reaction product from the reaction chamber having the smaller horizontal cross-sectional area, at least one inlet for admitting cooling fluid to the hollow walls and at least one outlet for cooling fluid from the hollow walls.

A preferred sulphonation apparatus specifically adapted for use in a process according to the invention comprises three substantially vertical coaxial cylindrical hollow walls defining between them two interconnected adjacent annular reaction chambers, i.e., longitudinally-extending reaction chamber, one of which annular reaction chambers having a larger horizontal cross-sectional area than the other annular reaction chamber, two annular manifolds connected to the annular reaction chamber having the larger horizontal cross-sectional area by two closely adjacent inlets adapted to distribute reactants uniformly around the lower end of said annular reaction chamber, said inlets preferably being annular orifices, a sulphur trioxide-diluent gas mixture inlet to one of the annular manifolds and a liquid organic material inlet to the other annular manifold, an outlet for the sulphonation reaction product from the lower end of the reaction chamber having the smaller horizontal cross-sectional area, at least one inlet for admitting cooling fluid to the hollow walls and at least one outlet for cooling fluid from the hollow walls. Preferably, the combined length of the two annular reaction chambers is from about 2 to about 100 feet.

During a sulphonation process according to the present invention, the reactants involved in the reaction step can be made to flow either upwards or downwards during the individual step or steps making up the whole reaction step.

During the first step of the sulphonation reaction of a preferred process according to the invention, the reactants flow upwards, i.e., longitudinally, and back mixing can occur. In apparatus in which the preferred superficial gas velocities of the invention are used, back mixing can be considerable, and under these conditions it has been noted that the bulk of the sulphonation reaction takes place in the first step; the back mixing is very beneficial for some materials because the flow of sulphonated material back into the unsulphonated material acts as a heat sink and helps to prevent localised high temperatures in the reactants. It is important during a sulphonation process that the reaction temperatures be kept as low as possible, consistent with the achievement of an adequate reaction, to avoid charring and discolouration of the reactants. As much as 90% or more of the total reaction can take place in the first step of a two-step reaction process. During the second step the reactants travel downwards at a higher velocity. This second step acts as a gas scrubbing step to remove the remaining traces of sulphur trioxide and thereby to achieve the maximum amount of conversion of the organic material to the sulphonated reaction product. The individual steps can be arranged to give various degrees of conversion by selective addition of reactants and/or degree of applied mixing.

The superficial gas velocity in the reaction chamber in which the initial step of a multi-step reaction is conducted can be from about 1 to about 300 ft per second, but should preferably be from about 2 to about 100 ft per second, and ideally from about 5 to about 30 ft per second. The superficial gas velocity in the reaction chamber or chambers in which the second and subsequent steps are conducted must be higher than that for the initial step and can be from about 5 to about 400 ft per second, although preferably from about 10 to about 200 ft per second, and ideally from about 15 to about 90 ft per second.

The time taken for the reactants to travel through the chamber or chambers of a sulphonation apparatus during a process according to the present invention will affect the nature of the final products of the reaction. This time will depend on the superficial gas velocities in the chambers and also on the combined length of the chambers and on the direction of travel of the reactants. The combined length of the chambers should preferably be from about 2 to about 200 ft, particularly preferably from about 5 to about 75 ft, and ideally from about 5 to about 50 ft.

The range of concentration of sulphur trioxide in the sulphur trioxide-diluent gas mixture should be varied according to the rate at which the organic material is fed into the apparatus and also according to the nature of the organic material itself. The sulphur trioxide concentration can vary from about 1 to about 50% by volume of the mixture, although preferably it will be from about 1 to about 30%, and particularly preferably from about 2 to about 15% by volume of the mixture.

The diluent gas will usually be air, but can be any inert gaseous substance which will not interfere with the desired sulphonation reaction or the products of that reaction.

The required mole ratio of organic material to sulphur trioxide will vary according to the temperature of the process, the degree of mixing (which itself is dependent upon the superficial gas velocities employed), the residence time of the reactants in the apparatus in which the process is being conducted, and the reactivity of the organic material and the nature of the reaction products formed. The mole ratio of sulphur trioxide to organic material can be from about 0.5:1 to about 2.0:1, but should preferably be from about 0.9:1 to about 1.5:1, and particularly preferably from about 1.0:1 to about 1.4:1.

The pressure under which the reaction is conducted can be either positive or negative, relative to atmospheric pressure.

The precise conditions of a process of the invention may need to be altered slightly in order to achieve the best yield of good quality detergent active material from a particular starting material. However, it will be well within the skill of the person familiar with the techniques of organic sulphonation to make such modifications to the process of the invention to achieve the best results, both in terms of the quality of the sulphonated product and the quantity produced per mole of starting material.

The process of the invention can be used to make surface-active compounds from a variety of organic materials such as alkyl benzenes the alkyl chains of which contain from about 4 to about 25, preferably from about 10 to about 18, carbon atoms, which react with sulphur trioxide to give the familiar alkyl benzene sulphonic acids (for instance dodecyl benzene sulphonic acid); alcohols containing from about 8 to about 20 carbon atoms in linear and branched chains, such as lauryl alcohol, stearyl alcohol and tallow alcohol, and mixtures thereof, which react with sulphur trioxide to give alkyl sulphuric acids; linear and branched-chain alpha and internal olefins containing from about 6 to about 25, preferably from about 10 to about 20, carbon atoms, particularly linear alpha olefins such as alpha hexadecene, and mixtures thereof, which react with sulphur trioxide to yield a variety of sulphonated compounds which collectively are sometimes known as olefin sulphonates; fatty acid alkanolamides derived from fatty acids containing from about 8 to about 22 carbon atoms, and mixtures thereof; fatty acids containing from about 8 to about 22 carbon atoms, such as lauric acid, oleic acid and tallow fatty acids, and mixtures thereof, and esters of lower alcohols with these fatty acids; polyhydric alcohol esters of fatty acids containing from about 8 to about 22 carbon atoms, such as tristearin, and mixtures thereof, and alkylene oxide derivatives thereof; and addition compounds of ethylene oxide, and mixtures of ethylene oxide and propylene oxide, to compounds having reactive hydrogen atoms, such as alcohols, alkyl phenols, fatty acid alkanolamides and fatty acids containing from about 8 to about 20 carbon atoms, in a mole ratio of from about 1:1 to about 30:1, such as tallow alcohol-20 ethylene oxide, nonyl phenol-10 ethylene oxide and lauric acid-5 ethylene oxide, and mixtures thereof.

Figure 2:
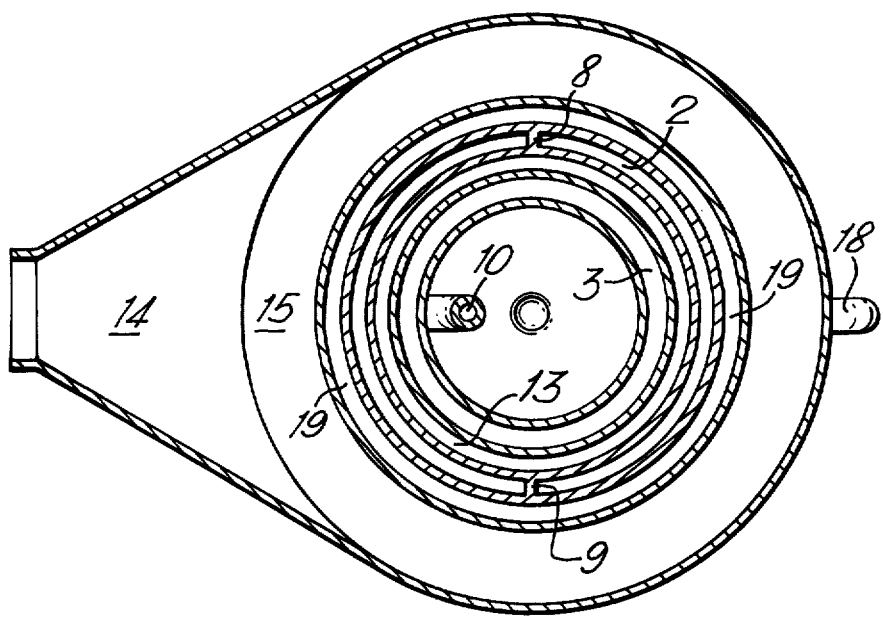

By way of example only, a preferred type of sulphonation reaction apparatus adapted for use in a process of the present invention will now be described with reference to the accompanying drawings, of which FIG. 1 is a cross-sectional elevation of the apparatus, and FIG. 2 is a sectional plan view of the apparatus on the line I—I in FIG. 1.

The sulphonation reaction apparatus shown in the drawings comprises three coaxial cylindrical cooling jackets 1, 2 and 3, the outer cooling jacket having a coolant inlet 4 and a coolant outlet 5, the intermediate cooling jacket having a coolant inlet 6, a coolant outlet 7 and a pair of baffles 8 and 9 (shown only in FIG. 2), and the inner cooling jacket 3 having a coolant inlet 10 and a coolant outlet 11. The cooling jackets are arranged such that an annular reaction chamber 12, i.e., an initial longitudinally-extending reaction chamber, lies between the outer cooling jacket 1 and the intermediate cooling jacket 2, and a second longitudinally-extending annular reaction chamber 13 lies between the intermediate cooling jacket 2 and the inner cooling jacket 3. A gaseous reactant inlet 14 leads into an annular manifold 15 which is connected to the lower end of the annular reaction chamber 12 by a narrow annular orifice 16. The gaseous reactant inlet 14 is adapted to distribute gaseous reactants around the annular manifold 15. Two liquid reactant inlets 17 and 18 lead into an annular manifold 19, which is also connected to the lower end of the annular eaction chamber 12 by a narrow annular orifice 20 set in close proximity to the annular orifice 16. The lower end of the reaction chamber 13 leads into a gas-liquid separator (not shown) to separate the residual gaseous reactants from the liquid sulphonated material.

The apparatus is constructed such that the annular reaction chamber 12 has a larger annular i.e., transverse, cross-sectional area than that of the reaction chamber 13, and hence the superficial gas velocity in the reaction chamber 12 is less than that in the reaction chamber 13. Thus the desired flow rate and mixing characteristics of the reactants inside the apparatus, required by the conditions necessary for the process according to the invention, will be achieved. During the process the sulphur trioxide-diluent gas mixture is fed through the inlet 14 into the manifold 15 and the organic material is fed through the inlets 17 and 18 into the manifold 19. The reactants intermix immediately after passing through the orifices 16 and 20, and travel upwards longitudinally through the reaction chamber 12 and downwards longitudinally at a faster rate through the reaction chamber 13.

The narrow annular orifice 16 may be modified if desired by the incorporation therein of a spacing ring, the spacing ring being perforated or notched so that the annular orifice becomes instead a plurality of small orifices. Such a modification may render easier the construction, and any subsequent modification, of the apparatus. The annular orifice 20 may be modified similarly.

It is to be emphasised that the specific reaction apparatus shown in the drawings, and hereinbefore described, is by way of example only, and can be subject to many other modifications and variations without departing from the spirit of the invention. One modification that will be apparent is that the apparatus can be constructed such that the reactants are made to travel upwards in an inner annular reaction chamber and then downwards in an outer annular reaction chamber. Also, although for many reasons it is both convenient and advantageous to have the apparatus of cylindrical construction this is not an essential feature of the apparatus, and the apparatus could be, for instance, constructed to incorporate vertical, essentially rectangular reaction chambers. Also, in processes in which, for instance, two or more fluid materials react autocatalytically, it may be necessary to conduct an initial step of the process at a superficial gas velocity higher than that used in subsequent steps.

It has been proposed hitherto, for instance in British patent specification No. 1,007,994, to use a single tapered reaction chamber for the conducting of sulphonation reactions. However, such a proposal would be extremely costly, due to the precise engineering tolerances required in the production of a tapered chamber. Moreover, such a tapered chamber would be costly to modify.

However, inherent in the present invention are several economic advantages. An apparatus according to the invention is of simple construction and in practice has been found not to require costly engineering tolerances. The apparatus can be operated at a pressure close to atmospheric, and this reduces the cost of a process conducted using the apparatus because complicated and expensive ancillary gas-handling equipment may not be required. Also, whereas single-chambered sulphonation reactors are usually larger cumbersome pieces of equipment, an apparatus of the present invention may be constructed as a very compact unit.

The process of the invention is illustrated by the following Examples.

EXAMPLE 1

The sulphonation of a commercially-available straightchain $C_{11-15}$ alkyl benzene, having an approximate molecular weight of 255, was conducted in a pilot-scale apparatus substantially as shown in the drawings.

The reaction conditions, and the properties of the reaction product, are given in Table I, from which it can be seen from the alkyl benzene sulphonic acid obtained had a very good colour and contained very little unreacted hydrocarbon.

The pressure in the reactor was within the range of 20 to 30 psia. Other process details are given in Table I.

EXAMPLE 2

A branched-chain alkyl benzene, having an approximate molecular weight of 260, was sulphonated as in Example 1, and the conditions and results are shown in Table II. The colour and conversion of the reaction product were very satisfactory.

EXAMPLE 3

A commercially-available substantially linear $C_{12-14}$ monohydric alcohol, having an approximate molecular weight of 200, was sulphonated in the same manner as in the previous Examples. The results are given in Table III, and from these it can be seen that satisfactory sulphonation of the alcohol was achieved.

EXAMPLE 4

A commercially-available substantially linear $C_{15-18}$ alpha-olefin, having an approximate molecular weight of 216, was sulphonated in the same manner as in the previous Examples. The results are given in Table IV, and it can be seen that good sulphonation of the olefin was achieved.

EXAMPLE 5

The sulphonation of a commercially-available straight-chain $C_{11-13}$ alkyl benzene, having an approximate molecular weight of 255, was conducted in a production-scale apparatus substantially as shown in the drawings, with the exception that the two annular orifices (16 and 20) were modified by the incorporation therein of notched spacing rings.

The two reaction chambers had the following dimensions:

| Outer chamber (12) | : Outer diameter | 14¾ inches |
|---|---|---|
| | : Inner diameter | 12¾ inches |
| | : Length | 52 inches |
| Inner chamber (13) | : Outer diameter | 11¼ inches |
| | : Inner diameter | 10¼ inches |
| | : Length | 64 inches |

The pressure in the reactor was in the range of 10 to 12 psia.

Other reaction conditions, and the properties of the reaction product, are given in Table V below, from which it can be seen that very satisfactory sulphonation was achieved.

TABLE I

SULPHONATION OF A STRAIGHT CHAIN ALKYL BENZENE (MOLECULAR WEIGHT APPROX. 255)

| | Reaction Conditions | | | Superficial Gas Velocity (ft/Sec) | | | | Reaction Product | |
|---|---|---|---|---|---|---|---|---|---|
| Run Number | Hydrocarbon Feed Rate (lbs/hr.) | $SO_3$/Air Ratio (% Vol.) | Moles $SO_3$ per mole of hydrocarbon | First Reaction Chamber | Second Reaction Chamber | Outlet Temp °C | NDOM* (% wt) | Lovibond Colour 10g→100 mls 1″ Cell | |
| | | | | | | | | Yellow | Red |
| 1 | 40 | 2.6 | 1.13 | 17 | 56 | 44 | 1.5 | 0.7 | 0.1 |
| 2 | 80 | 4.8 | 1.10 | 17 | 57 | 44 | 1.5 | 0.8 | 0.2 |
| 3 | 120 | 6.5 | 1.12 | 20 | 66 | 54 | 1.2 | 0.8 | 0.1 |
| 4 | 160 | 8.1 | 1.07 | 20 | 68 | 55 | 2.0 | 0.7 | 0.1 |
| 5 | 200 | 10.3 | 1.11 | 21 | 69 | 65 | 1.7 | 1.6 | 0.7 |

*Non-Detergent Organic Matter, expressed as a percentage weight of the total reaction product.

TABLE II

SULPHONATION OF A BRANCHED CHAIN ALKYL BENZENE (MOLECULAR WEIGHT APPROX. 260)

| | Reaction Conditions | | | Superficial Gas Velocity (Ft/Sec) | | | | Reaction Product | |
|---|---|---|---|---|---|---|---|---|---|
| Run Number | Hydrocarbon Feed Rate (lbs/hr.) | $SO_3$/Air Ratio (% Vol.) | Moles $SO_3$ per mole of hydrocarbon | First Reaction Chamber | Second Reaction Chamber | Outlet Temp °C | NDOM (% Wt) | Lovibond Colour 10g→100 mls 1″ Cell | |
| | | | | | | | | Yellow | Red |
| 1 | 40 | 2.4 | 1.06 | 17 | 56 | 44 | 1.7 | 1.7 | 0.6 |
| 2 | 80 | 4.8 | 1.12 | 17 | 57 | 54 | 1.7 | 1.1 | 0.4 |
| 3 | 120 | 6.7 | 1.2 | 20 | 67 | 61 | 1.6 | 1.5 | 0.3 |
| 4 | 160 | 7.7 | 1.04 | 20 | 67 | 71 | 2.3 | 2.8 | 0.6 |

TABLE III

SULPHONATION OF AN ALCOHOL (MOLECULAR WEIGHT APPROX. 200)

| | Reaction Conditions | | | Superficial Gas Velocity (ft/Sec) | | | | Reaction Product | |
|---|---|---|---|---|---|---|---|---|---|
| Run Number | Alcohol Feed Rate (lbs/hr.) | $SO_3$/Air Ratio | Moles $SO_3$ per mole of alcohol | First Reaction Chamber | Second Reaction Chamber | Acid Outlet Temp °C | Conversion (%) | Lovibond Colour 3½% A.D. in 5¼″ Cell | |
| | | | | | | | | Yellow | Red |
| 1 | 60 | 5.8 | 1.19 | 15 | 49 | 34 | 92.8 | 3.7 | 0.9 |

TABLE IV

SULPONATION OF A $C_{15-18}$ ALPHA-OLEFIN (MOLECULAR WEIGHT APPROX. 216)

| | Reaction Conditions | | | Superficial Gas Velocity (ft/Sec) | | Reaction Product | | Lovibond Colour 1% A.D. in 1" Cell | |
|---|---|---|---|---|---|---|---|---|---|
| Run Number | Olefin Feed Rate (lbs/hr.) | $SO_3$/Air Ratio (% Vol.) | Moles $SO_3$ per mole of olefin | First Reaction Chamber | Second Reaction Chamber | Acid Outlet Temp °C | Conversion (%) | Yellow | Red |
| 1 | 40 | 3.8 | 1.35 | 16 | 53 | 39 | 94.6 | 2.7 | 0.6 |

TABLE V

SULPONATION OF A STRAIGHT CHAIN ALKYL BENZENE (MOLECULAR WEIGHT APPROX. 255)

| | Reaction Conditions | | | Superficial Gas Velocity (ft/Sec) | | Reaction Product | | Lovibond Colour 10g/100 mls 1"Cell | |
|---|---|---|---|---|---|---|---|---|---|
| Run Number | Hydrocarbon Feed Rate (lbs/hr.) | $SO_3$/Air Ratio (% Vol.) | Moles $SO_3$ per mole of hydrocarbon | First Reaction Chamber | Second Reaction Chamber | Acid Outlet Temp °C | NDOM (% Wt) | Yellow | Red |
| 1 | 320 | 2.7 | 1.05 | 13.6 | 35.4 | 39.5 | 3.2 | 1.3 | 0.3 |
| 2 | 640 | 6.0 | 1.05 | 11.7 | 30.4 | 45.5 | 3.0 | 2.5 | 1.0 |
| 3 | 640 | 6.0 | 1.06 | 11.7 | 30.4 | 45.5 | 2.5 | 2.6 | 1.0 |
| 4 | 640 | 6.0 | 1.05 | 11.7 | 30.4 | 44.5 | 3.3 | 1.7 | 0.6 |
| 5 | 640 | 6.5 | 1.06 | 10.8 | 28.2 | 50.0 | 2.4 | 2.7 | 1.0 |

What is claimed is:

1. A continuous process wherein a liquid organic material selected from the group consisting of:
   a. linear- and branched-chain alkyl benzenes, the alkyl chains of which contain from about 10 to about 18 carbon atoms;
   b. linear unsubstituted monohydric alcohols containing from about 8 to about 20 carbon atoms, and
   c. linear unsubstituted alpha-olefins containing from about 10 to about 20 carbon atoms; is reacted with sulphur trioxide in a sulphur trioxide-air mixture in two separate steps, the initial step being conducted by passing the sulphur trioxide-air mixture and the liquid organic material longitudinally through an initial longitudinally extending reaction chamber with a superficial gas velocity of from about 5 to about 30 feet per second, the second step being conducted by passing the material emerging from said initial reaction chamber longitudinally through a second longitudinallyextending reaction chamber cross-section with a superficial gas velocity which is higher than the superficial gas velocity in said initial reaction chamber and which is from about 15 to about 90 feet per second, the initial concentration of sulphur trioxide in the sulphur trioxide-air mixture being from about two percent to about 15 percent by volume, the initial mole ratio of the sulphur trioxide to the liquid organic material being from about 0.9:1 to about 1.5:1, the pressure under which the reaction is conducted being from about 5 to about 30 psia, and the superficial gas velocity in each reaction chamber being defined as the velocity at which gaseous reactants would pass through the reaction chamber in the absence of any liquid reactants and which may be calculated from the expression $$S = V/A$$

wherein $S$ is the superficial gas velocity in the reaction chamber, expressed in feet per second, $V$ is the volume of gas at STP which is fed into the reaction chamber per second, expressed in cubic feet, and $A$ is the transverse cross-sectional area of the reaction chamber expressed in square feet.

2. A process according to claim 1 wherein said mole ratio is from about 1.0:1 to about 1.4:1.

* * * * *